Nov. 18, 1924.  J. J. STAMPEN  1,515,707

MILKING MACHINE

Filed Jan. 23, 1922  3 Sheets-Sheet 1

Inventor:
Jacob J. Stampen
By Cheever & Cox Att'ys

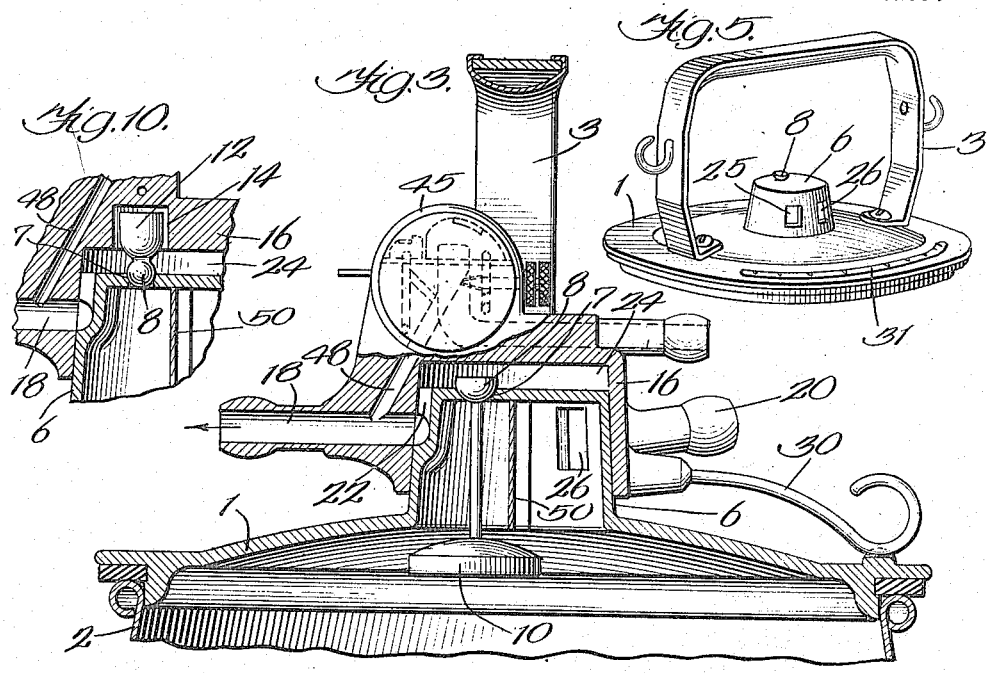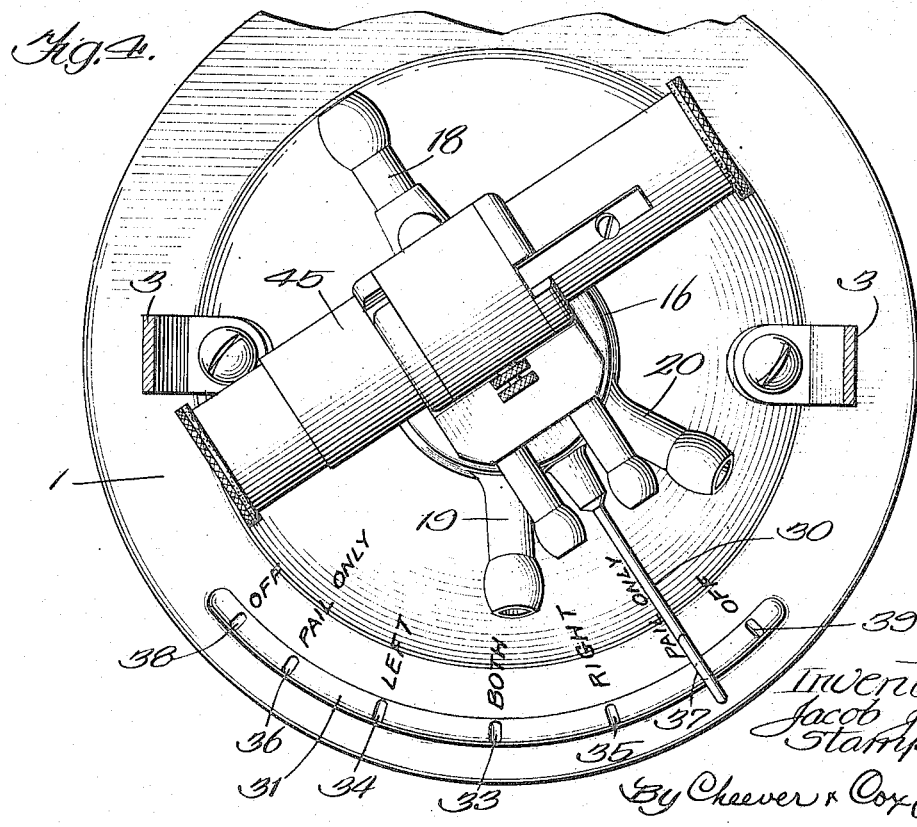

Nov. 18, 1924.
J. J. STAMPEN
1,515,707
MILKING MACHINE
Filed Jan. 23, 1922      3 Sheets-Sheet 3
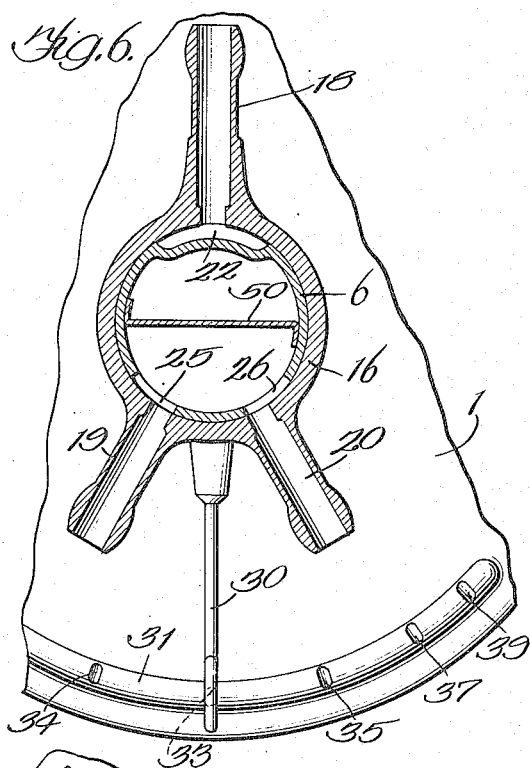
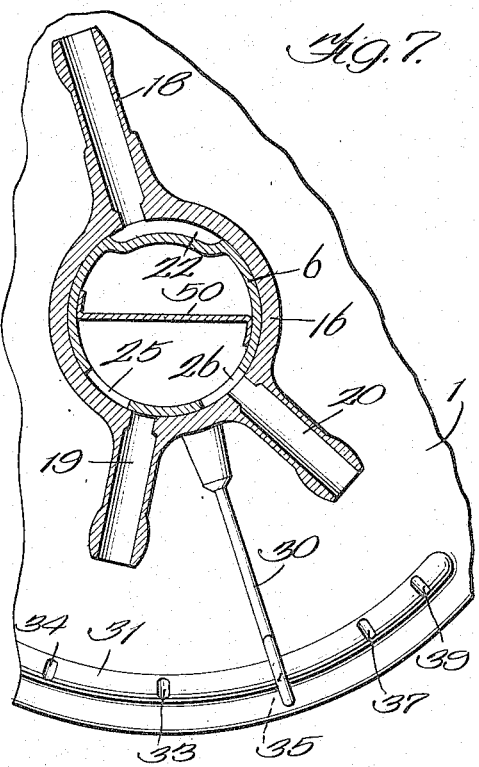
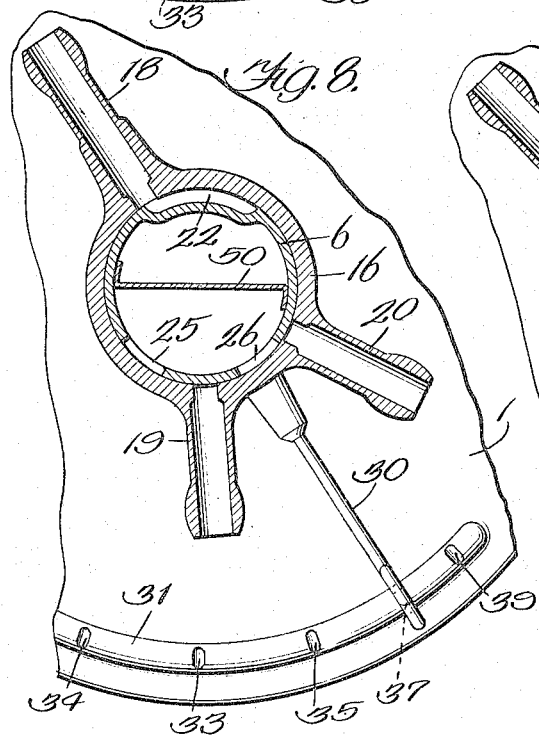
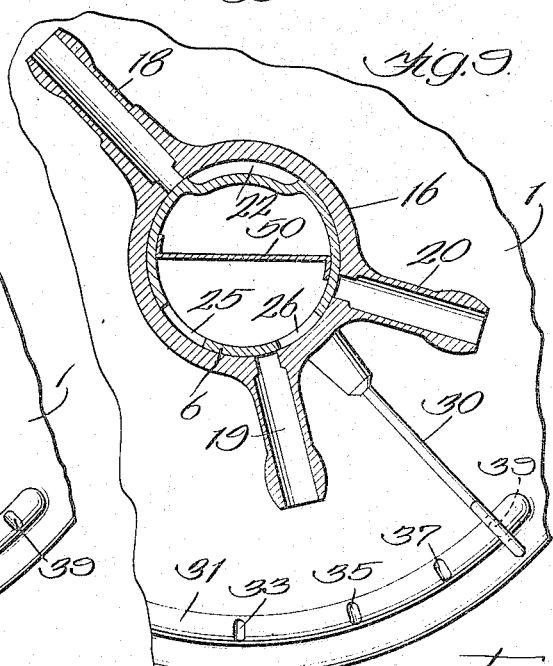
Inventor:
Jacob J. Stampen
By Cheever & Cox Attys.

Patented Nov. 18, 1924.

1,515,707

UNITED STATES PATENT OFFICE.

JACOB J. STAMPEN, OF CHICAGO, ILLINOIS, ASSIGNOR TO PINE TREE MILKING MACHINE COMPANY, OF CHICAGO, ILLINOIS, A CORPORATION OF ILLINOIS.

MILKING MACHINE.

Application filed January 23, 1922. Serial No. 531,113.

*To all whom it may concern:*

Be it known that I, JACOB J. STAMPEN, a citizen of the United States, residing at Chicago, in the county of Cook and State of Illinois, have invented a certain new and useful Improvement in Milking Machines, of which the following is a specification.

My invention relates to milking machines, and particularly to the parts associated with the cover of the milk pail. One of the objects of the invention is to provide a valve between the interior and exterior of a milk pail, which will keep its seat regardless of the position of the pail. This applies more particularly to check valves of the ball type. In the modern milking machine the milk pail is kept under vacuum, and a check is employed to prevent reverse flow of fluid. Ball checks are frequently employed for the purpose, as illustrated, for example, in Fosler Patent 1,376,804 and Babson Patent 1,383,369. With the construction there shown, if the center of gravity of the ball shifts sideways (as is apt to happen if the milk pail stands in a tilted position due to resting upon straw or bedding in a dairy barn) the seal will be broken, and the ball will not prevent the reverse flow of fluid. My purpose is to provide a check valve having a spherical acting surface, but constructed in such manner that it will always fit closely to its seat, regardless of the position to which the milk pail may be tilted.

Another object of the invention is to improve the means for controlling the action of the machine, and to make it possible by simply throwing a single lever to various positions to put the machine in condition to milk both cows, or either one of them alone, or to keep the vacuum on the pail only, or to shut off the air entirely. Another object is to provide a construction such as to immediately remove from the machine any milk or froth that may pass out through the check valve. Still another object is to so arrange the air passages as to effectually prevent any of the lubricating oil of the pulsator from gaining access to the interior of the pail. A further object is to improve the mounting of the pulsator and simplify the construction of the parts, and reduce the number thereof.

I accomplish these objects by the mechanism illustrated in the accompanying drawings in which—

Figure 3 is an elevation of the parts shown in Figure 1. The view is chiefly in central vertical section.

Figure 4 is a top plan view of the milk cover and pulsator, showing the latter in a different position from the one shown in Figure 2.

Figure 5 is a small perspective view showing the pail cover with its turret, but with the hood and pulsator removed.

Figure 1:
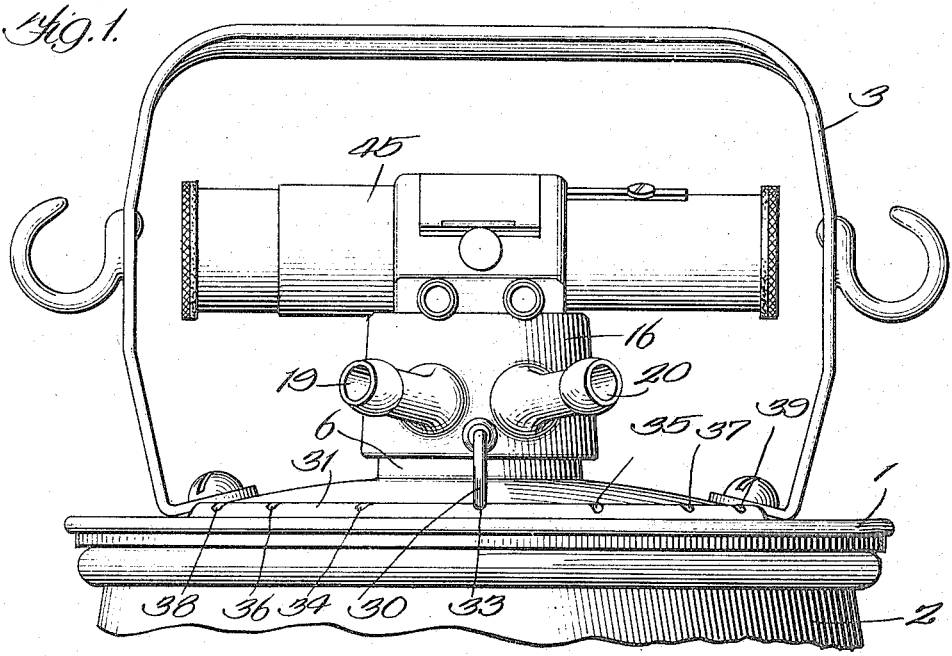
Figure 1 is a side elevation of the pail cover and pulsator, showing them in position upon the top of a milk pail.

Figures 6, 7, 8, and 9 are plan sections taken through the turret and hood showing the different positions of the latter.

Figure 10 is a vertical sectional view of a modified form of check valve.

Like numerals denote like parts thruout the several views.

In the forms selected to illustrate the invention the cover 1 of the milk pail 2 has a handle 3 in accordance with the usual custom. Rising from the center of the cover is a trunco conical or slightly tapered dome or turret 6 which is preferably flat on top and has a ported valve seat 7 adapted to support a spherical valve 8. It is desirable, altho not essential, that the valve seat also be spherical so as to make surface contact with the spherical portion of the valve. Suspended from the valve as shown in Figure 3 is a weight 10 which is free to swing laterally with the result that the pail may be tilted without causing the valve to become unseated or break the seal. This is an important consideration, for it frequently happens in dairies that the floor where the milk pail is placed is uneven or may be covered with straw or bedding unevenly distributed, with the result that the pail does not stand exactly vertical, but inclines slightly to one side or the other. With a weighted valve as here shown this does not happen, for the center of curvature of the valve remains in place, altho the center of gravity of the combined valve and weight shifts. So long as the center of curvature remains fixed, the port will remain sealed and prevent a flow of air or liquid down through the port into the pail.

It is not essential that the weight be located beneath the valve seat as in Figure 3, for it may be above it as shown in Figure 10. In this second form the weighted portion 12 is located in a chamber 14 above the spherical portion of the valve. This chamber is small enough to limit the lateral movement of the weighted portion of the valve. It will be evident that with this construction also the pail may be tilted without causing the acting portion of the valve to leave any part of its seat.

Figure 2:
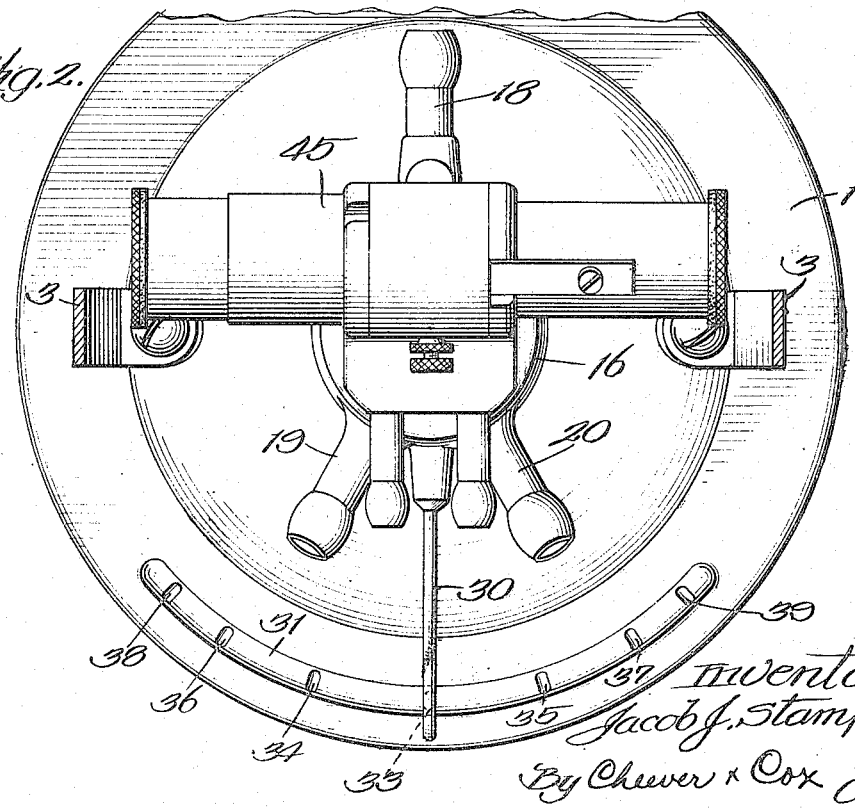
Figure 2 is a top plan view of the parts shown in Figure 1, the upper portion of the handle being omitted for the sake of clearness.

Now referring again to the form shown in Figures 1 to 9:

Fitting over the turret 6 is a hood 16 from which lead 3 nipples 18, 19 and 20. Nipple 18 is designed to be connected to the hose which draws air from the apparatus. Nipples 19 and 20 are designed to be connected to the hose or flexible tubes which communicate with the two claws of groups of teat cups. It will be understood that the machine is designed to milk two cows simultaneously, and the nipples 19 and 20 connect with the inside of the "inflation" of the respective groups of teat cups. These parts are well known and need not be illustrated. The nipple 18 may be regarded as the eduction passage or duct for drawing air from the milk pail and from the pulsator, while the nipples 19 and 20 constitute milk passages and are designed to exert a gentle vacuum for drawing the milk into the pail. A passage 22 is formed in the side of the turret. Its upper end communicates with the space 24 between the top of the turret and the under surface of the hood. At the lower end it is circumferentially extended sufficiently to maintain communication with nipple 18 for a plurality of positions of the hood (five according to the present design). This will be best understood by reference to Figures 3 and 6 to 9. Turret 6 also has two ports 25 and 26 adapted to cooperate with the nipples 19 and 20 respectively. These ports may be closed by rotating the hood one degree or step to the right or left of neutral position.

The hood is rotated on the turret by means of a handle 30 which at its outer end cooperates with a quadrant 31 having a plurality of shallow notches 33, 34, 35, 36, 37, 38, 39. The handle is slightly resilient so that when in any notch it will tend to remain there, but may be moved by the exertion of moderate pressure from the side.

The pulsator 45 is mounted upon the hood 16 and hence is rotatable with it. Its precise construction need not be here described as it may be varied, but it may, if desired, operate in accordance with the principles described in the Fosler patent above mentioned, the cylinders being arranged end to end instead of side by side. It will be sufficient for the present to state that the air by which the pulsator is operated flows through a duct 48 shown on the left side of Figures 3 and 10. It will be noted that this duct leads into the nipple 18 at a point between the turret and the outer end of the nipple. It will also be noted the nipple is lower than the top of the turret. The result is that any oil drawn from the lubricator will be discharged into the nipple 18 at a point down-stream from the turret, and at a point below the level of the top of the turret and by no possibility can it gain access to the milk pail.

Operation: In practice the air hose which leads to the vacuum line and air pump (not shown) is connected to the nipple 18 and draws from it the air necessary for operating the pulsator and maintaining a moderate vacuum in the milk pail and in the milk tubes leading to the pail. The ports in the turret and hood are so arranged that when handle 30 is in the central notch 33 as shown in Figure 6, the duct 18 will be in communication with the pulsator thru the duct 48 and with the space 24 thru the passage 22. Consequently air is drawn from the pail thru the port 7 and suction is created in the milk ducts 19, 20. It is desirable, in order to prevent the milk from ducts 19, 20, gaining access to the port 7, to provide a shield or baffle 50 which extends in a vertical plane across the turret 6. It will be evident that when the hood and pulsator are in this central position the pulsator, pail and milk tubes 19, 20 will be under vacuum. Of course the term "vacuum" is employed in the relative sense, meaning partial vacuum, and it will also be evident that, owing to the weight of the valve 8 (which acts as a reducing valve as well as a check valve) the air tension is greater in tube 18 and passage 48 than in the pail or in the milk tubes 19, 20.

If, now, the handle 30 is shifted one more notch to the right, as shown in Figure 7, the suction tube 18 will remain in communication with the pulsator and with the chamber 24. The interior of the milk pail will remain under vacuum and so also will tube 20, but communication with tube 19 will be closed. Consequently the pulsator will operate, but communication with one of the claws will be shut off. Thus the machine is in condition for operating upon one animal alone, for example, the one located to the right of the machine. A similar condition of affairs will prevail if the handle be moved to the notch 34 at the left, except that the animal at the left may be milked, the claw at the right being out of use. In other words, the valves and ports are symmetrical with respect to the central position of the handle, and by moving the handle one notch to the left or one notch to the right of central position, the animal to the left or the animal to the right may be operated on alone.

If the handle be shifted to the notch 37, which is the second notch to the right of central position the ports will assume the relation shown in Figure 8, where it will be evident that the pail will be maintained under vacuum, but communication with the milk tubes 19, 20 will both be cut off. The same is true if the handle be shifted to the notch 36 at the left of the center.

If the handle be shifted to the end notch 39 as shown in Figure 9 the air duct or vacuum tube 18 will lie beyond the end of the passage 22 and hence will be cut off from the pail, thus sealing it with a closure additional to the one effected by the check valve 8. One of the advantages of this supplemental seal is that it will effectually maintain the vacuum within the pail, and make it safe to lift the pail and its contents by the handle on the cover, the cover being held in place simply by air pressure due to the partial vacuum within the pail. The same condition prevails when the handle is in the notch 38 at the extreme left. During these extreme positions of the handle the milk tubes 19, 20 remain shut off as illustrated in Figure 9.

Thus it will be evident that when the handle is in central position both cows may be milked: When the handle is at the first notch to the right or left, one claw will be idle while the other is operating: When the handle is moved one notch further to the right or left a vacuum will be actively maintained on the pail while both claws are shut off: When the handle is in the notch at either end of the quadrant there will be a double seal on the pail, and both milk tubes will be cut off. It will also be evident that the pulsator is held to its seat on the pail cover by vacuum, and hence tends to maintain close contact with the sides of the turret. The vacuum in the pail may be immediately broken by simply lifting the pulsator off of the turret. No fastening devices are necessary for holding the pulsator in place, and under operating conditions its position is rendered secure by external atmospheric pressure. It will also be observed that the turret and hood may be readily kept clean and sanitary, for when the hood is lifted off the internal surfaces are readily accessible for cleaning purposes. It will also be noted that the air or vacuum duct 18 is below the port 7 and below the upper end of passage or port 22. The result is that any milk or froth issuing from the pail will be immediately drained off. The same will be true of any oil that may be drawn from the pulsator. Another characteristic is that duct 48 connects with duct 18 at a point between the port 7 (or port 22) and the mouth of duct 18: Hence the air flow in duct 18 is in a direction to draw the oil from the pulsator immediately away from the ports instead of toward them.

What I claim as new, and desire to secure by Letters Patent is:

1. In a milking machine, a pail cover having a port and a member rotatably mounted on said cover and having a milk duct provided with a hose connection rotatable in unison with said member, said duct being in communication with said port when said member is in one angular position and out of communication when said member is in another angular position.

2. In a milking machine, a pail cover and a member rotatably mounted thereon, said member having two milk ducts rotatable in unison with it; and means on the pail cover for opening communication between said ducts and the inside of the pail when said member occupies one position, and adapted to cut off communication with one of said ducts when said member occupies another angular position.

3. In a milking machine, a pail cover having two ports and a member rotatably mounted on said cover, and having two milk ducts, both of the ducts being in communication with their respective ports when the rotatable member is in one angular position; one of the ducts being in communication with its port and the other out of communication with its port when said member occupies a different angular position.

4. In a milking machine, a pulsator, a pail cover having a port thru which air may be exhausted, and a member rotatably mounted on said cover and adapted to support the pulsator, said member having an air duct adapted to communicate with a source of vacuum, said member when in one position holding said duct in communication with said port, and when occupying a different angular position holding said duct out of commuincation with said port, whereby the opening and closing of said port depends upon the angular position of said member and the pulsator with respect to the pail cover.

5. In a milking machine, a milk pail cover having a turret with a port passing thru it and a hood fitting over the turret and rotatable thereon, said turret having a vacuum duct adapted to be brought into and out of register with said port when the hood is rotated to different angular positions.

6. In a milking machine, a milk pail cover having a turret with a plurality of ports passing thru it, and a hood fitting over the turret and rotatable thereon, said turret having two milk ducts adapted to be brought into and out of register with said ports when the hood is rotated in different angular positions.

7. In a milking machine, a milk pail cover having a turret with a plurality of ports and a hood fitting over the turret and rotatable thereon, said turret having milk and vacuum ducts adapted to be brought into and out of register with said ports when the hood is rotated to different angular positions.

8. In a milking machine, a milk pail cover having a turret with three ports communicating with the inside of the cover, and a hood fitting over the turret and rotatable thereon, said hood having a vacuum duct and two milk ducts, and being capable of occupying three different positions angularly, the vacuum duct being in register with one of the ports in all three positions of the hood and the milk ducts both being in register with their respective ports in one position of the hood, and one of the milk ducts being out of register when the hood occupies one of the other positions and the other milk duct being out of register when the hood occupies the third angular position.

9. In a milking machine, a milk pail cover having a turret with two ports communicating with the inside of the cover, and a rotatable hood fitting over the turret, the hood having two milk ducts and being capable of occupying different positions angularly, both ducts being in register with the ports when the hood is in one position, and both being out of register with the ports when the hood occupies a different angular position.

10. In a milking machine, a pail cover having a turret with three ports communicating with the inside of the cover, and a hood rotatably mounted on the turret, the hood having an air vacuum duct and two milk ducts adapted to register with the different ports when the hood is in one angular position, all three ducts being out of register with the ports when the turret occupies another angular position.

11. In a milking machine, a pail cover having a turret with a ported valve seat on the top, a check valve adapted to rest in said seat for preventing in-flow thru it, a hood fitting over said turret and spaced from the top thereof, the hood having a vacuum duct and being capable of occupying different angular positions upon the turret, and a port in the side of the turret communicating with the space between the top of the turret and the hood, the milk duct registering with said port when the hood occupies one angular position, and being out of register when the hood occupies a different angular position, thus affording a seal in addition to the sealing effect of the check valve.

12. In a milking machine, a milk pail cover having a turret with three ports communicating with the inside of the cover, and a hood fitting over the turret and capable of occupying different angular positions thereon, the turret having a vacuum duct and two milk ducts; in one angular position of the cover all three ducts being in register with their respective ports; in another angular position of the cover the vacuum duct and one of the milk ducts being in register with their ports, and the other milk duct being out of register; and in the third angular position the vacuum duct being in register with its port, and the first milk duct being out of register, and the second one in register; and in a fourth angular position of the hood the vacuum duct being in register with its port, and both of the milk ducts being out of register with their ports.

In witness whereof, I have hereunto subscribed my name.

JACOB J. STAMPEN.